Oct. 25, 1932.    J. P. BEM    1,884,527
PITTING MACHINE
Filed Feb. 4, 1929    13 Sheets-Sheet 1

INVENTOR
JOSEPH P. BEM
BY Julien A. Bried
ATTORNEY

Oct. 25, 1932.  J. P. BEM  1,884,527
PITTING MACHINE
Filed Feb. 4, 1929   13 Sheets-Sheet 2

INVENTOR
JOSEPH P. BEM.
BY  Julien A. Bried
ATTORNEY

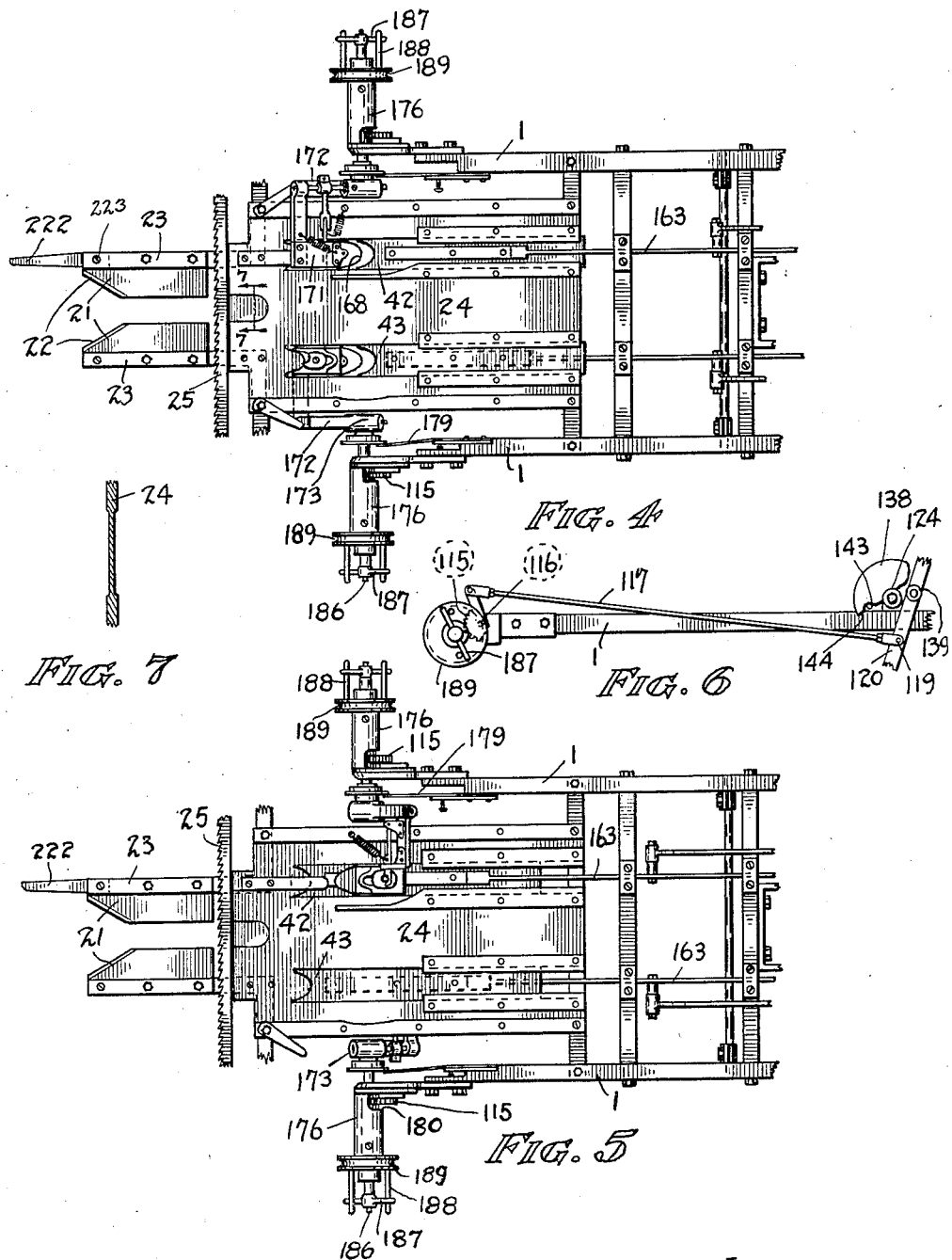

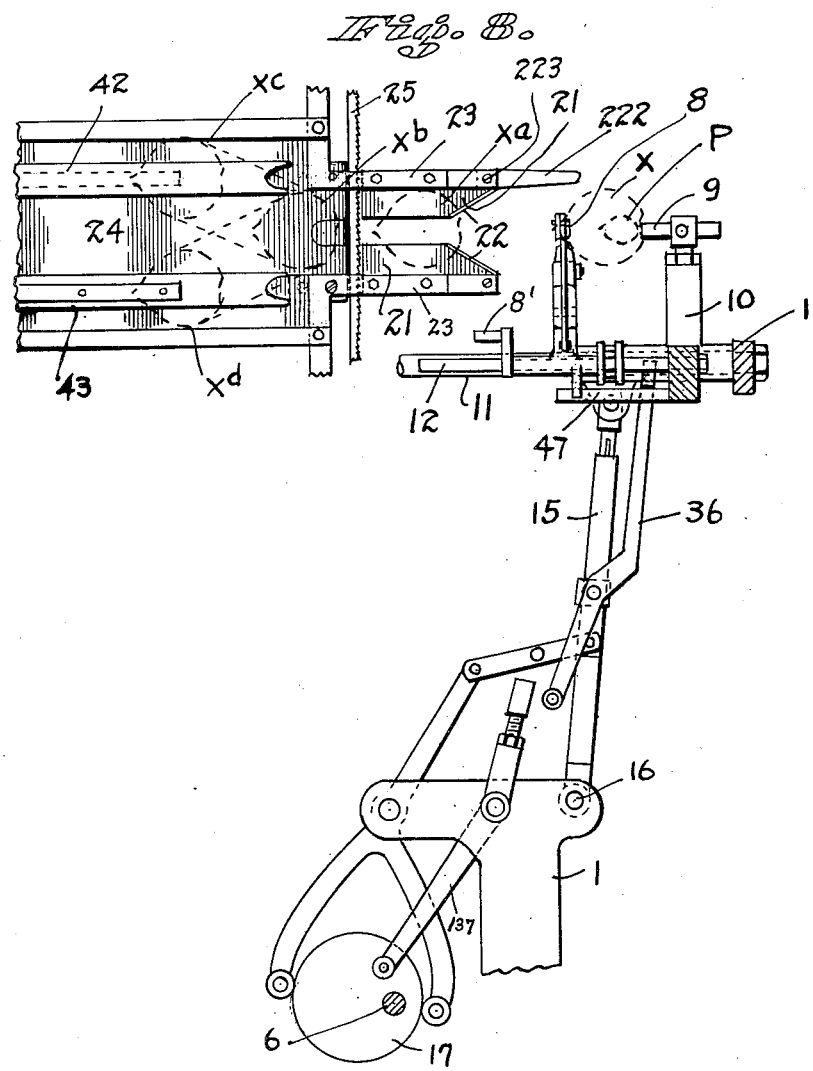

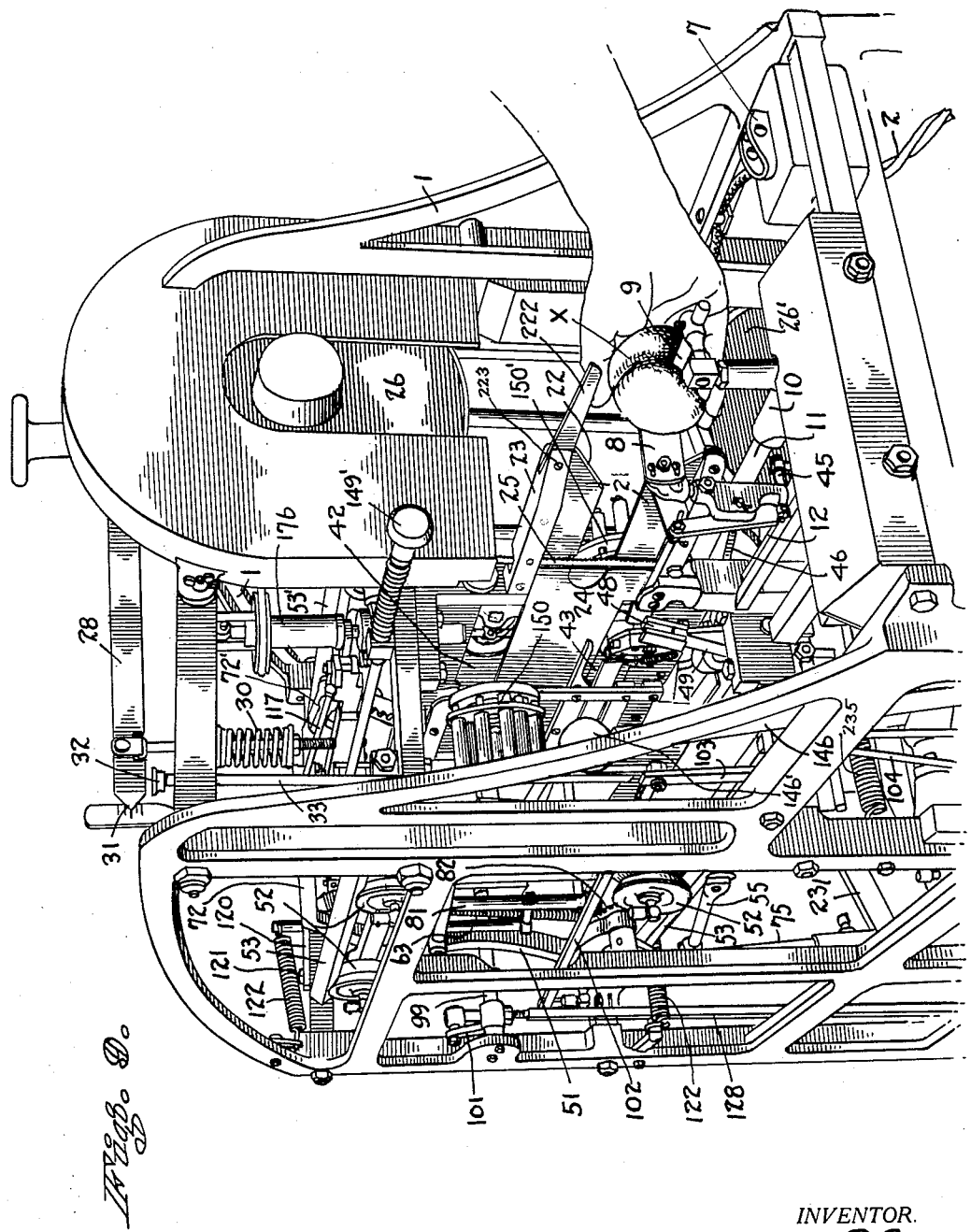

Oct. 25, 1932.  J. P. BEM  1,884,527

PITTING MACHINE

Filed Feb. 4, 1929  13 Sheets-Sheet 6

Fig. 10.

INVENTOR.
JOSEPH P. BEM.
BY Julien A. Bried
ATTORNEYS.

Oct. 25, 1932.  J. P. BEM  1,884,527
PITTING MACHINE
Filed Feb. 4, 1929   13 Sheets-Sheet 7
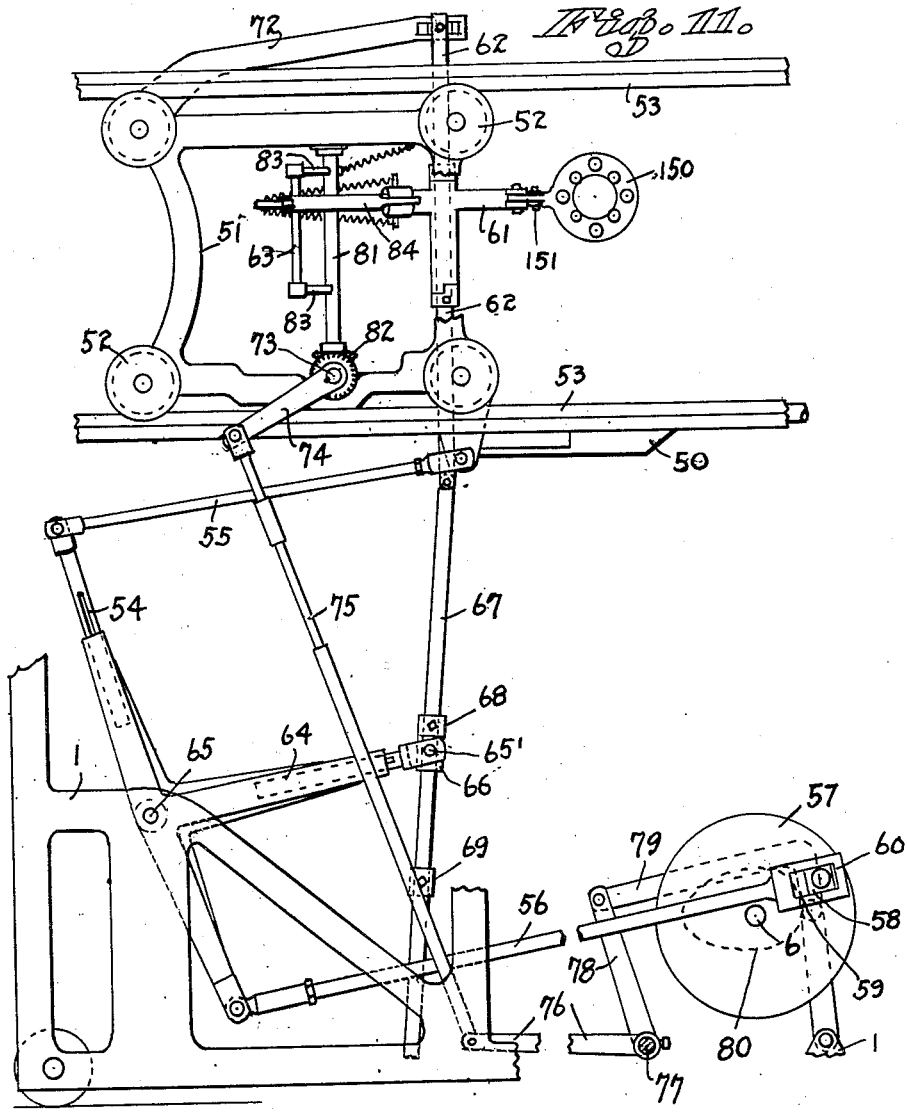
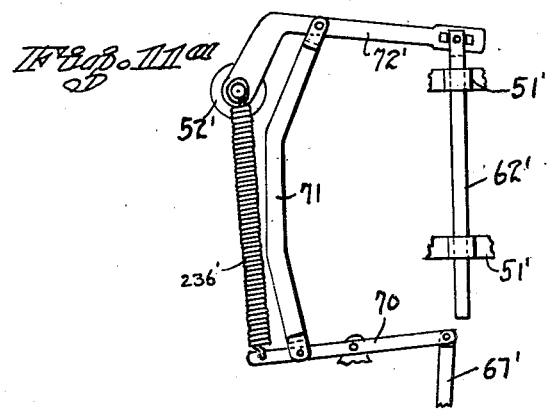
INVENTOR.
JOSEPH P. BEM.
BY
ATTORNEYS.

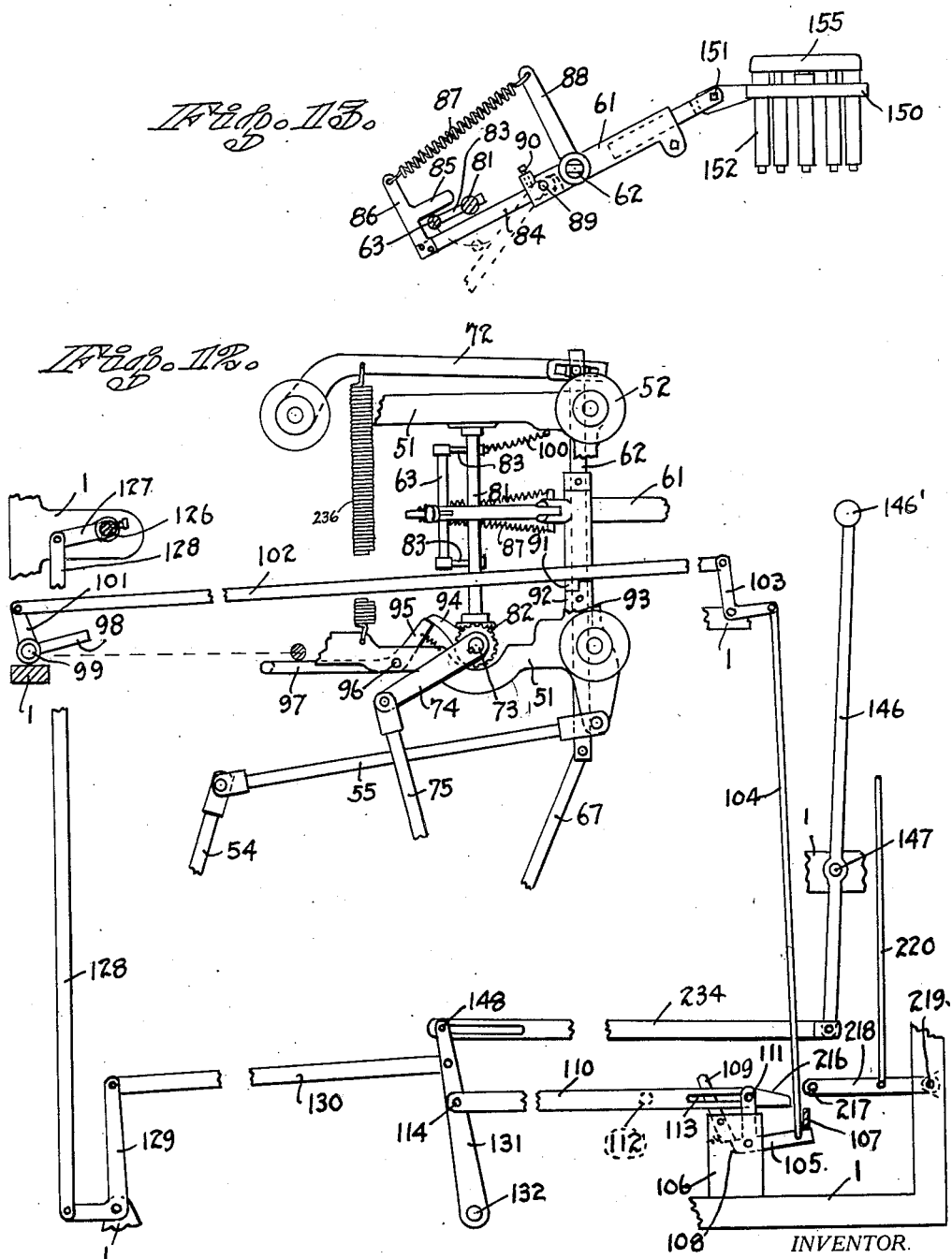

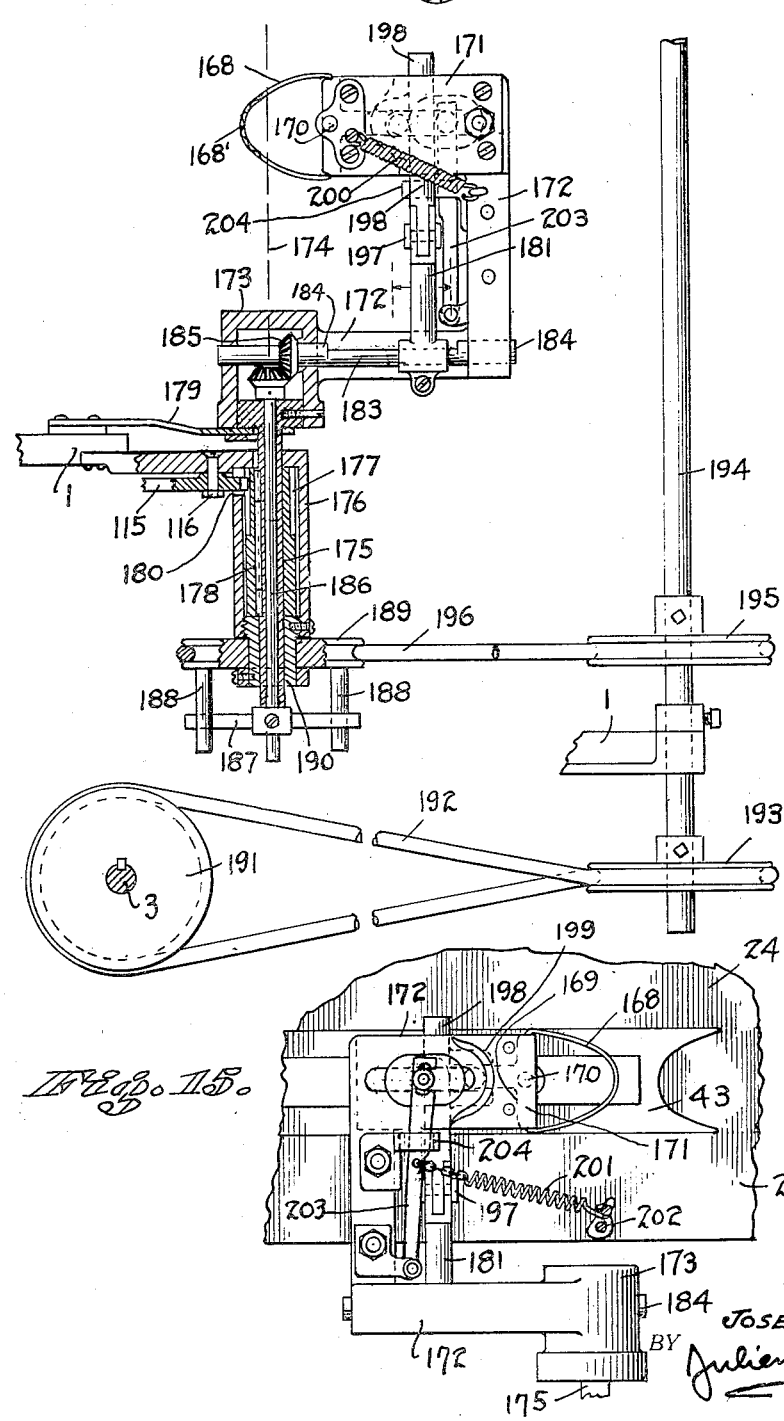

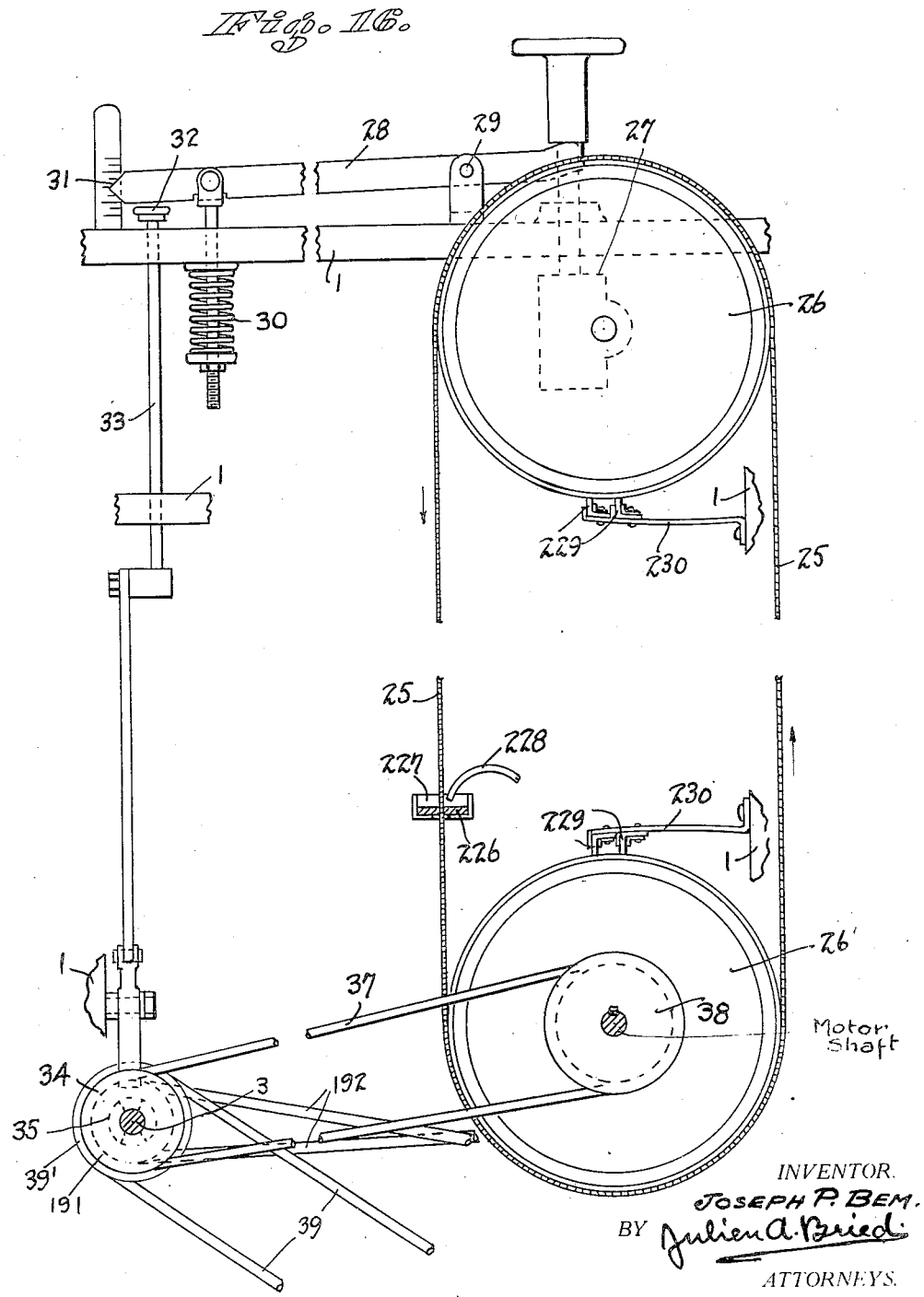

Oct. 25, 1932.  J. P. BEM  1,884,527
PITTING MACHINE
Filed Feb. 4, 1929  13 Sheets-Sheet 11
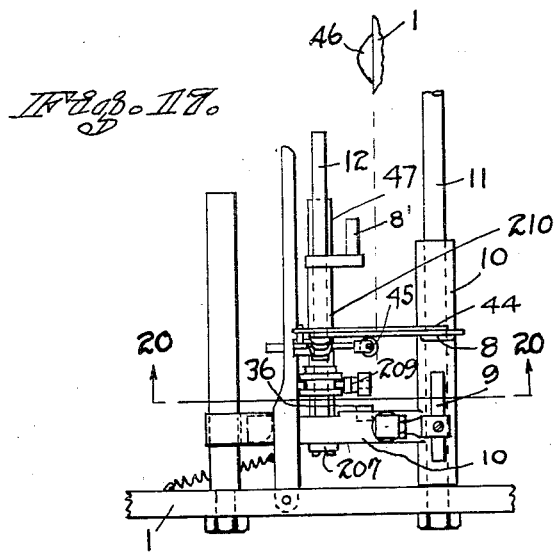
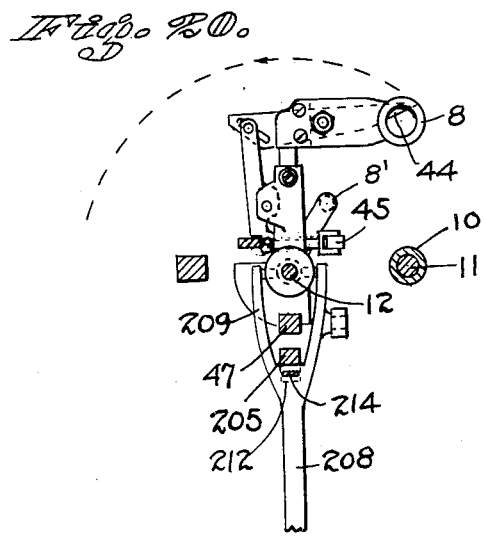
INVENTOR.
JOSEPH P. BEM,
BY Julien A. Bried
ATTORNEYS.

Oct. 25, 1932.  J. P. BEM  1,884,527
PITTING MACHINE
Filed Feb. 4, 1929  13 Sheets-Sheet 12
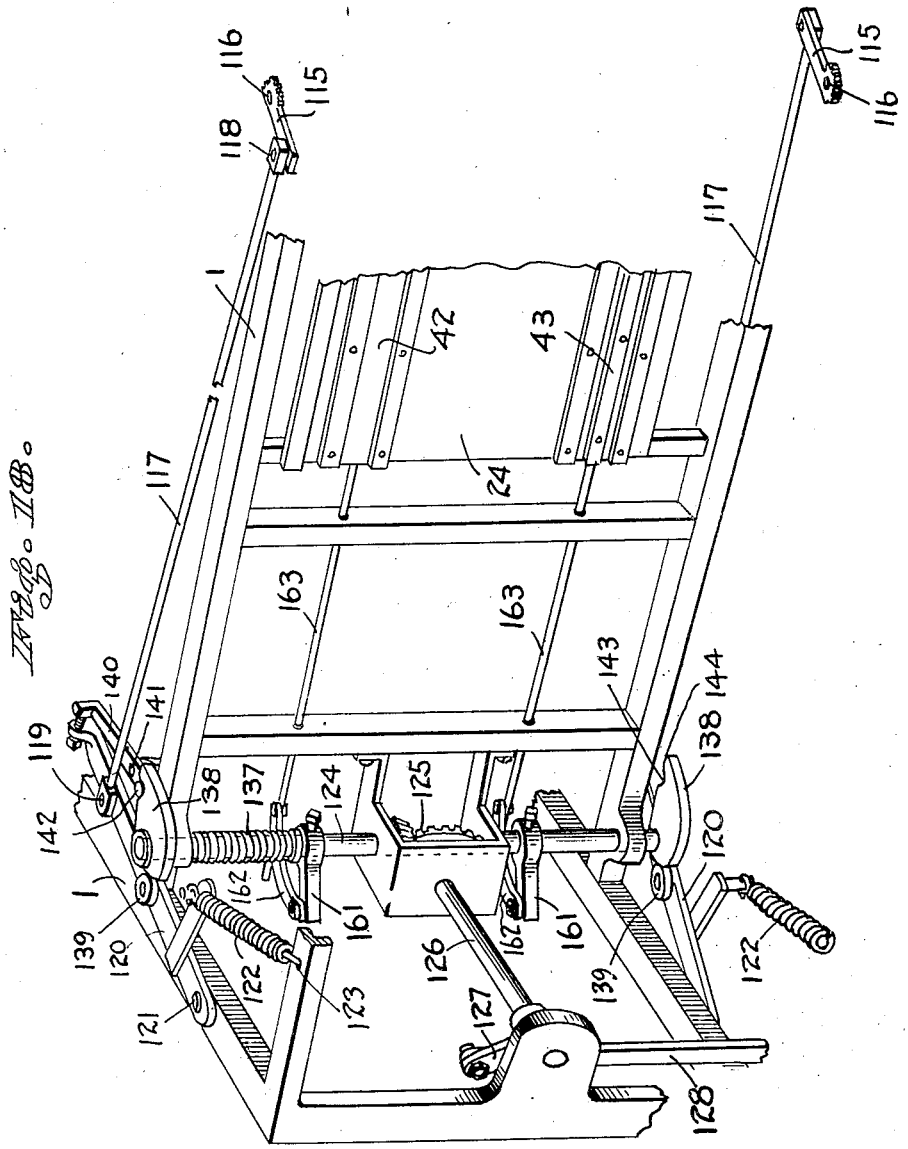
INVENTOR.
JOSEPH P. BEM.
BY *Julien A. Bried*
ATTORNEYS.

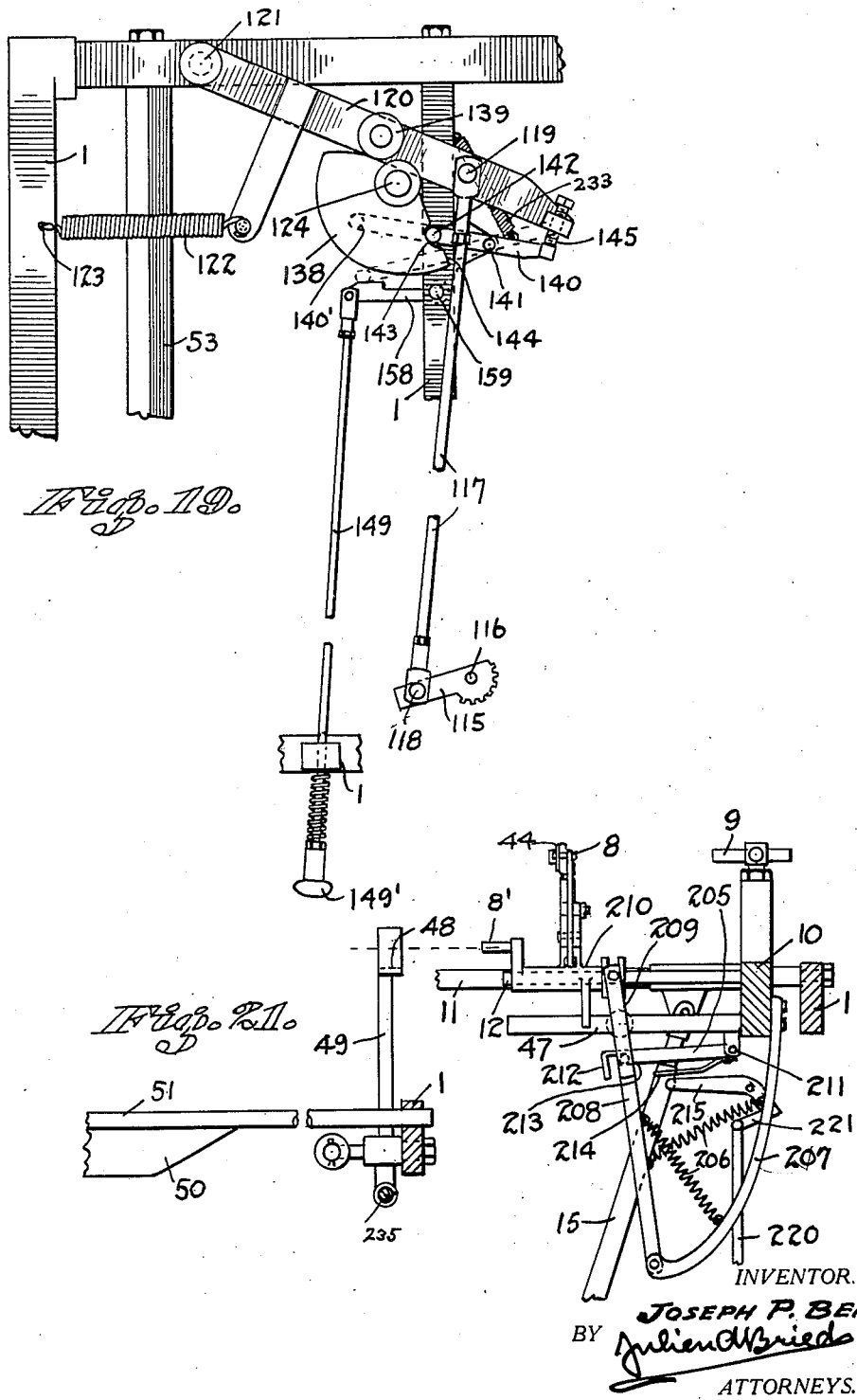

Patented Oct. 25, 1932

1,884,527

UNITED STATES PATENT OFFICE

JOSEPH P. BEM, OF FRESNO, CALIFORNIA, ASSIGNOR TO PACIFIC PITTING MACHINE COMPANY INC., OF FRESNO, CALIFORNIA, A CORPORATION OF CALIFORNIA

PITTING MACHINE

Application filed February 4, 1929. Serial No. 337,343.

This invention relates to machines for pitting drupaceous fruits, particularly peaches, and it has for its objects the improvement of such machines of the type shown in my prior U. S. Patent No. 1,581,482 and joint Patent 1,480,802.

Since the present machine includes many of the features shown and described in said patents, these patents are referred to herein as a basis for a clearer understanding of the present machine, for though the present machine is simple, the somewhat congested arrangement of its parts, which include numerous cranks and levers, makes it more difficult to follow in a description without a full understanding of the earlier disclosures.

Such machines, while capable of pitting any fruit whether of the drupaceous variety or not, are chiefly useful in the pitting of clingstone peaches in the canning industry, and since a peach of this variety is non-symmetrical with relation to its pit, and the pits vary greatly in size, many prior machines failed in practice on account of wasting the fruit through their inability to properly predetermine the position of the pit in the fruit with respect to the pitting blade, and with the consequent necessity of cutting out a large portion of valuable meat in order to be certain of cutting out the largest pits which might be encountered.

The prior patents mentioned were the first in the peach pitting machine art to disclose certain new principles for the successful operation of such machines to eliminate waste of meat, and which principles included:

First—Centering the fruit by means of aligned receiving devices engaging the fruit at the bloom and stem ends.

Second—Presenting the thus centered fruit to succeeding instrumentalities for operation on the fruit while always maintaining the position of the fruit in the same relation to these instrumentalities as it was to the first or receiving devices which centered it from the bloom and stem ends.

One of the succeeding operations to which the fruit was subjected was the sawing or bisecting of it through a plane extending through its bloom and stem ends as determined by the bloom and stem end centering devices thus insuring a cleavage directly through the center of the pit irrespective as to whether it was centralized in the fruit body.

Another of the operations was to present the fruit to a movable pitting blade in such a manner that the blade entered the fruit at a point just back of the stem end of the pit as its position was predetermined by the stem end centering device.

An important feature was to provide a flexibly mounted blade which after entering the peach at the point described would yield to the size of and therefore hug the pit as it went around and cut out the same, thus cutting out the pits without waste of meat.

Other features were, the form of and vibration or oscillation of the blades, power control to prevent breakage of the blades, transmission elements by which power was distributed to the various machine elements, etc.

All of the above basic features together with others common to the prior patents mentioned are retained in the present machine, the chief points of distinguishment being:—

The elimination of fruit impaling pins used in my prior machines for holding the fruit in position as predetermined by the bloom and stem end receiving devices, for the various operations to be performed.

The eliminating of the former necessity of separating or spreading apart of the bisected halves of the fruit for presentation over the pitting table so that the knives could get between the halves, and with consequent danger of losing the precise position of the peach as predetermined by the bloom and stem end receiving and centering devices.

The elimination of an apertured pitting table over the aperture of which the halved fruit had to be accurately placed or slid to position with consequent danger of marring the fruit against the edges of the aperture, or shifting it slightly out of position.

The elimination of all pressure against the sides of the saw during bisecting of the fruit with danger of slightly displacing the fruit in its holders.

The elimination of the plurality of receiving and centering devices formerly used and accomplishing the result with but one set of devices.

The general use of reciprocatory motion in the main moving parts of the machine to thereby make the same set of instrumentalities successively perform on each peach, and thus reducing the cost of duplicating expensive parts of the apparatus.

Other features all cooperating to improve the machine will appear in the following description.

In the drawings accompanying this application Fig. 1 is a perspective view as seen from the discharge end of the machine.

Fig. 4 is a side elevation of the pitting guide plate or table and associated parts.

Fig. 5 is a view similar to Fig. 4 but showing the slides in the table closed.

Fig. 6 is an enlarged plan view of the blade swinging hook-up.

Fig. 7 is an enlarged sectional view of the pitting guide plate taken along the line 7—7 of Fig. 4.

Fig. 8 is a diagrammatic view showing the successive positions of a peach advancing from receiving to pitting position, and the feeder carriage action.

Fig. 9 is a perspective view of the machine as seen from the receiving end, showing a peach being inserted between the bloom and stem end centering devices.

Fig. 10 is a view similar to that of Fig. 9 but shows the centered peach advanced into the machine on the receiving carriage and impaled on the guide-plates, the bloom end device swung out of the path of the fruit and the fruit clamping devices engaging opposite sides of the peach.

Fig. 11 is a semi-diagrammatic simplified view showing the general leverage hook-up for operating the main carriage and clamping arms and devices carried thereon, the levers of one side (left) only being shown.

Fig. 11A shows the reversing lever system for raising and lowering one of the fruit clamp devices as used at right side of machine only.

Fig. 12 is a semi-diagrammatic view showing details of the leverage hook-up for swinging and releasing the clamping arms.

Fig. 13 is a plan view of part of Fig. 12 and showing one of the clamping devices, portion of the view is shown in cross section.

Fig. 14 is an enlarged elevation showing one of the arched, vibratory, pitting blades, carriage mounting, and diagrammatically indicating the drive for vibrating the blades.

Fig. 15 is a view showing the reverse side of the blade carriage of Fig. 14.

Fig. 16 is a semi-diagrammatic view showing the band saw drive and associated features.

Fig. 17 is a plan view of the receiving carriage and associated parts.

Fig. 18 is a diagrammatic perspective sketch illustrating the inter-relation of the blade swinging gear, pitting table slide actuation, and safety latches which prevent machine starting on a new cycle until both blades have finished cutting.

Fig. 19 is an enlarged plan of one of the blade cams of Fig. 18 to better show the safety lock action.

Fig. 20 is a sectional elevation of the receiving carriage as seen from the line 20—20 of Fig. 17 to better show the bloom end device and tip cutter.

Fig. 21 is a side elevation of the receiving carriage showing the parts which control the movements of the bloom end device.

Figure 1:
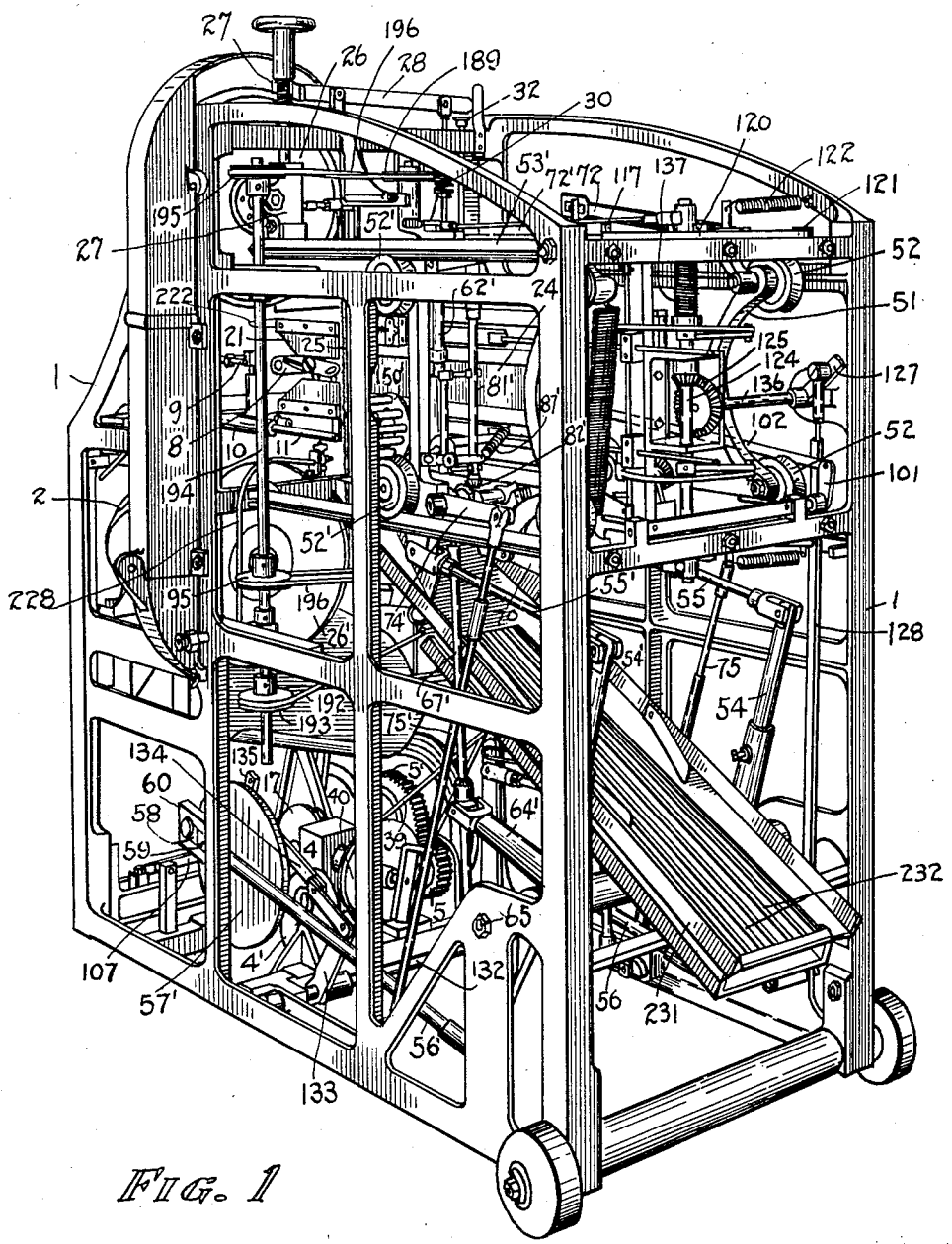

Before entering a detailed description of the drawings, a short description of the improved machine and its mode of operation will be given so as to make the drawings more understandable.

Briefly stated the machine comprises a main frame carrying a motor, transmission machinery, a main cam shaft, clutch, jackshaft, and all moving and stationary elements of the machine, and centrally supporting a thin flat vertically disposed plate of metal, on opposite sides of which are two vibratory arched pitting blades positioned one above the other. At the forward edge of this plate in line therewith is a band saw, and extending forwardly of the band saw are two aligned continuing portions of the plate spaced edgewise vertically from one another to form a pair of aligned guide plates adapted to pass into the flesh of the peach above and below the pit and guide the fruit into the saw.

In front of these guide plate extensions is a reciprocable feeder carriage mounting the bloom and stem end peach receiving and aligning devices, and which carriage forces the aligned peach into engagement with the plate extensions and leaves it impaled thereon.

Fruit clamping devices mounted on a reciprocable rolling or sliding main carriage are provided to grasp the plate engaged fruit from the receiving carriage devices, drag it "through" the saw and shift the halves; without separating the same and while constantly pressed against the plate; one upward and one downward on the plate to position over the pitting blades.

Slides in the plate are then actuated to open "under" the fruit, and the pitting blades while vibrating swing through the openings and through the peach halves to cut out the pits.

A schedule showing the sequence of operations in a cycle of the machine given here, instead of at the end of the specification, will greatly aid an understanding of and simplify the detailed description of the parts to follow:—

Schedule of operations:—

(With motor of the machine running, band saw in motion, and pitting blades continuously vibrating.)

0. Peach is manually positioned between bloom and stem end centering devices carried on reciprocable feeder carriage, and bloom end device springs toward stem end device to hold peach aligned.

1. Pressure on starting lever first releases peach clamping devices from previously pitted fruit halves permitting halves to fall into discharge chute.

2. Further pressure on treadle makes clutch release inactive so that clutch at once engages the main cam shaft with motor reduction gearing.

3. Main carriage is drawn outward toward the operative on tracks by revolution of cam shaft and carries with it the fruit clamping devices mounted thereon.

4. One clamping device rises and one falls while carriage is moving until both are in alignment with path of peach, now advancing into the machine on the centering devices on feeder carriage.

5. Centering devices continue to move horizontally and force centered peach into engagement with margins of edgewise spaced guide plates.

6. During travel of centering devices tip cutter on the bloom end device is operated by contact with stationary cam on frame of machine, and thereby cuts tip from peach.

7. When peach is well engaged between the guide plates, bloom end device moves faster in advance of peach and an extending cam arm on main carriage approaching from opposite direction trips or swings bloom end device to one side out of the path of travel of the peach and the approaching clamping device on that side.

8. Main carriage with clamping devices comes to state of rest for a moment and feeder carriage stops momentarily, with peach engaged with aligning plates and starts to reverse leaving peach impaled in plates.

9. Clamping devices close resiliently against opposite sides of peach while impaled on the guide plates.

10. Main carriage reverses and the clamping devices engaging the peach aligned in plates drag the peach into the machine along the plates and "through" a band saw running across a gap in the plates. (Saw being thinner than plates is entirely relieved from side pressure which would otherwise be caused by inward pressure of clamping arms.)

11. Reversal of main carriage withdraws its cam arm from bloom end trip so that bloom end device swings back to aligned position with stem end device, and feeder carriage carries both back to starting or fruit receiving position and stops with bloom end device set for springing against the fruit as at start "0" of the schedule.

12. Main carriage continues advancing into the machine and the sawed halves of peach slide along on a solid continuation of guide plates behind saw until clear of saw. (This continuing plate is of reduced thickness over the sawed pit area to prevent wedging of partially sawed pit thereon.)

13. Main carriage continues its movement with both clamping devices still resiliently holding sawed peach halves tightly against the solid section of the guide plate and one device then moves upward and one downward to shift the peach halves to different positions on opposite sides of the plate yet without separating the halves, or in any way changing their grip on the halves to endanger the alignment of pit relative to the devices and pitting operation to be performed.

14. Clamping devices with peach halves again come to rest for a moment and two slides are actuated in the plate; one "under" each peach half so as to open a space under each half pit, for the pitting blades to swing through.

15. Just as the slides in the plate are about open, the arched pitting blades; one on each side of the plate; begin to swing through the peach halves held firmly against the opposite sides of the plate by the clamping devices.

16. Pitting blades are rapidly oscillated while swinging thru the fruit until half pits fall into chute. These blades are not positively forced through the fruit, but are simply released for action at the proper time and swing independently through their respective halves of the fruit through the urging influence of independent springs so that just so much pressure will be on each blade to do its work and no more, and if either blade should meet with too much resistance from any cause whatsoever it will lag or stop, while the other blade being independent will complete its cut, but until both blades entirely complete their cuts the machine is locked against further movement as a locking latch must be tripped by each blade mechanism upon completion of the cut before the machine can continue to cycle.

17. This is the end of the cycle of movements of the machine, as the cam shaft clutch is automatically tripped out of engagement and the machine elements actuated thereby stop as soon as blades are swung into the fruit and no repetition of the cycle takes place until the foot treadle is again pressed to start the operations beginning with No. 1 of the above schedule to thereby separate the clamping devices from the pitted fruit halves so that the halves can fall from the machine, it being understood that the manual operation "0" of the schedule, i. e. placing a new peach in position between the bloom and stem end centering devices is repeated just before each tripping of the foot lever. If desired however, the clutch will trip back into re-engagement automatically at the end of each cycle to repeat the series if the foot (or a weight) be left upon the foot treadle to hold it down, for in this case an automatic clutch trip release provided would be held inoperative and not be able to trip the clutch out of engagement at each revolution of the cam shaft, but the shaft would continue to revolve to repeat the schedule of operations 1 to 16 each time.

During the carrying out of the scheduled or main operations above given quite a number of intermediate operations take place, some of which are:—

During operation No. 3 of the schedule the arched pitting blades swing back a half revolution to starting position while the slides in the plate are open, the slides close to re-establish a plain imperforate surface on the plate for the next pair of fruit halves to slide upon for positioning opposite the blades, and the blades lie with their carriages flatwise adjacent the plate until the next peach is in place over them.

The arched pitting blades oscillate or vibrate continuously whether cutting or not, and the band saw runs continuously as these are driven from the motor independently of the main power or cam shaft which is clutch-tripped at each complete revolution and which causes and times the other movements of the machine.

Also a foot pedal locking device is provided which is automatically released by return movement of the levers at the completion of each pitting operation, functioning substantially as the foot pedal locking device of my former patent mentioned.

Detailed description of the machine and drawings with reference to the above schedule of operations, will now be given:—

The machine comprises a main frame 1 provided with many projecting points and extensions for the anchoring and/or fulcruming of the various stationary and movable members which are positioned between its sides.

On the machine is a motor 2 belted to a jack-shaft 3 in turn belted to suitable reduction gearing at 4, 5, 5' to operate a main transmission cam-shaft 6, a suitable dog-clutch (not shown) forming part of the transmission being interposed between the gearing and the shaft.

The electric switch for energizing the motor is located at 7 for convenience of the operative who sits at this (receiving) end of the machine.

The cam shaft 6 carries a plurality of cams (as at 17, 57', 136) arranged to move a plurality of levers upon revolution of the shaft, and the levers are returned to initial position at each revolution of the shaft, some positively by the cams and others by springs, thus effecting the various movements of the machine elements in proper timed sequence substantially in the manner described in my prior Patent No. 1,581,482.

Above the motor at the forward end of the machine are the peach receiving and aligning devices 8 and 9. Device 8 is a ring-like member at the end of a horizontally extending arm adapted to receive and center the bloom end or tip of the peach, while device 9 is a tubular member adapted to seat in the depression at the stem end of the peach and in fact cut into slightly and stop substantially against the pit of the peach which is very close to the skin at this end.

Device 9 is mounted on a carriage 10 which is horizontally slidable in a direction away from and toward the operative on a supporting guide bar 11, while device 8 is similarly slidable on a guide bar 12 which extends from and is itself carried on the carriage 10 or slidable base structure of device 9. The reason for device 8 being independently slidable on the structure of device 9 while at the same time slidable with it, it is because it is desirable at one point in the sliding of the devices to advance device 8 more rapidly than device 9 and also swing device 8 sidewise out of the path of other members, particularly one of the clamping devices which clamp and drag the peach "through" the saw. (See No. 7 of preceding schedule of operations).

A peach X is positioned by hand between the devices 8 and 9 with its seam or suture uppermost so as to insure the pit within lying lengthwise between the devices and with its greatest width in a vertical plane, in the same manner as in the peach receiving devices of my former patent mentioned, device 8 being spring actuated to close in on the peach after slightly pushing it away by pressure of the bloom end against it when inserting the peach by the operative, this act tripping a latch (205 Fig. 21) which normally holds it from closing in on the peach as described in more detail hereinafter, in the same general manner as described in said former patent, so that after release of the latch the movement of device 8 in direction of device 9 centralizes the peach therebetween from the bloom and stem ends respectively. Stem end device 9 is tubular to seat itself in the hollow at the stem end of the peach and to straddle any little stem thereon all as described in said former patent.

After the peach X is positioned in the centering devices 8 and 9 the clutch trip 14 is released by pressure of operatives' foot upon treadle 13 to start revolution of cam shaft 6 which amongst other things revolves cam (17 in Fig. 8) to positively swing a lever 15 forward and backward in one revolution of the shaft. This lever 15 is pivoted to the frame at 16 and is suitably linked and connected for operation by the cam 17, the upper end of the lever being pivoted to the receiving carriage or sliding base 10 which supports devices 8 and 9 as indicated in Fig. 8.

As the centered peach is carried away from the operative; or inwardly into the machine; it meets the vertically aligned edges of spaced guide plates 21. These plates are spaced edgewise one above the other a sufficient distance to pass or straddle the widest portion of a peach pit contained in the fruit and are exactly on a center line passing through both peach centering devices 8 and 9 and therefore on the median line of the pit of a peach centered therein. The plates are beveled outwardly and sharpened on their beveled edges at 22 so as to cut into the flesh of the peach as it is forced along toward them by the carriage 10, or rather by the pressure of device 9 impinging the stem end of the fruit as shown in Fig. 10.

The spaced plates 21 are supported from the frame on rigid bars 23 at their outer edges and they are virtually extensions of a main plate 24 over the surface of which the sawed peach halves are slid to position for pitting, after cutting by band saw 25. This saw extends vertically in the plane of the plates in a gap left between the extensions 21 and the main plate 24.

The saw is carried over wheels 26—26, the latter or lower one being secured directly on the motor shaft and the upper one on a bearing (27 in Fig. 16) supported by a tensioning lever arm 28 pivoted to the frame at 29, adjustably spring tensioned at its long end at 30, while just under its tension indexing point 31 is a clutch release striking knob 32 so arranged that in event of the saw breaking, the lever will instantly strike the knob and force downward a rod 33 to throw out the main transmission clutch pulley 34 from clutch hub 35 on jack-shaft 3 so as to disconnect the transmission from the source of power, all as indicated best in Fig. 16 wherein the transmission drive will be seen to be effected by a belt 37 from pulley 38 fast on motor shaft to clutch-pulley 34 on jack-shaft, thence by belt 39 from another pulley (39') on shaft 3 back to pulley 40 on worm shaft of one part of gear reduction in boxes 4—4', other gears of the reduction being shown at 5—5' (see Fig. 1 for some of these members).

In the inward movement of receiving carriage 10 the peach X is forced into the plates 21 and left therein at position Xa upon return of carriage, (see Fig. 8) clamping devices 150—150' then move outward toward the impaled peach, clamp it and draw it "through" the saw to position Xb on the main plate 24 and then the clamps shift the halves while tightly held against the plate, one up and one down on opposite sides of the plate to positions Xc and Xd over the slides 42, 43 in the plate.

Figures 2, 3:
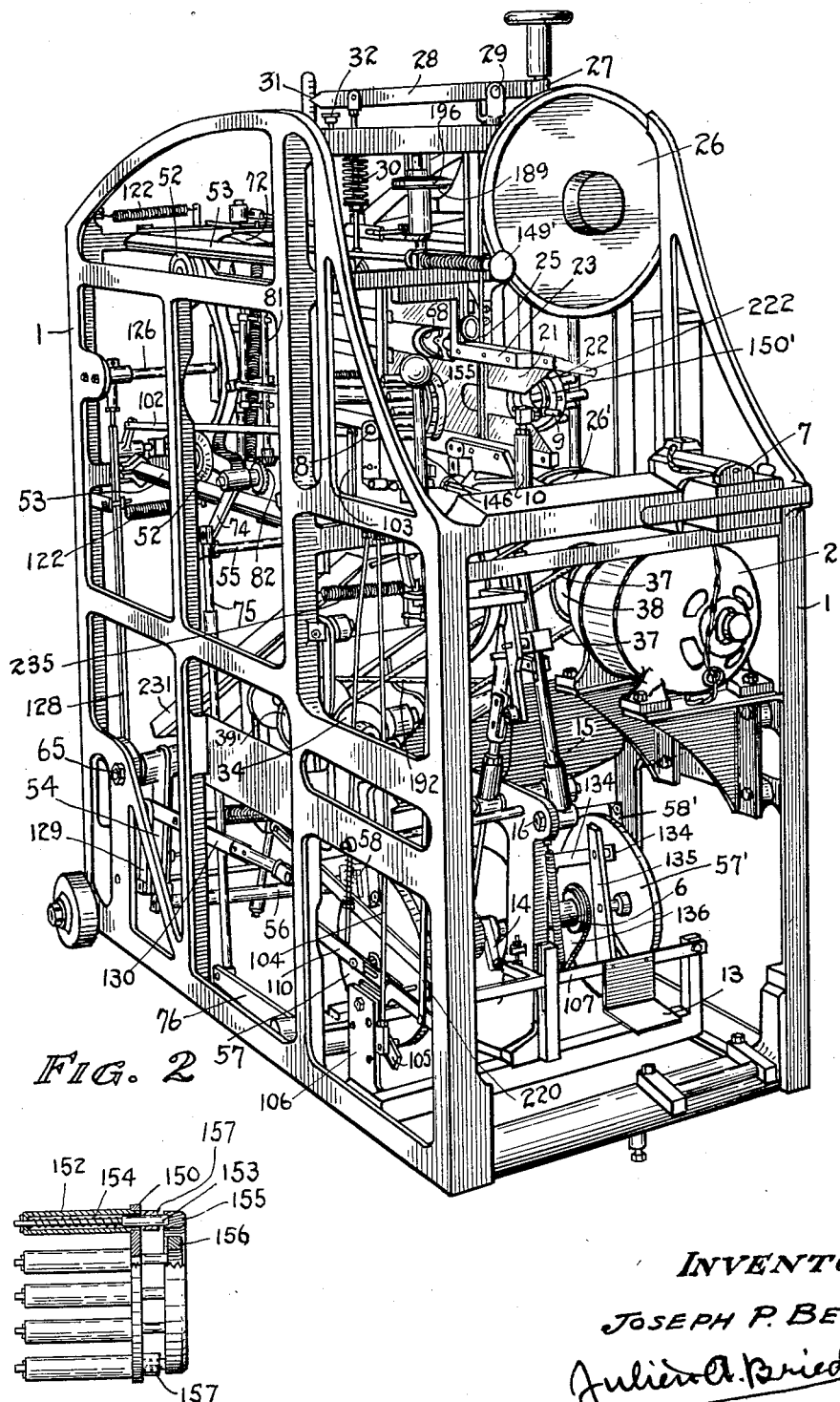
Fig. 2 is a perspective view of the machine as seen from the receiving end.
Fig. 3 is an enlarged side view, partly in section, of one of the fruit clamping devices.

The clamping devices (see Fig. 3) each include a holder portion adjustably joined to its arm by a firm clamp joint 151 (Fig. 13) so that it may be set at the proper working angle to the fruit, and the holder is ring form with a plurality of small cylinders 152 projecting therefrom and slidably operating within these cylinders are small pistons or pins 153 urged outwardly of the cylinders by small spiral compression springs 154.

Independently secured to the outer ends of the pistons are two concentrically arranged soft rubber rings 155, 156, the larger one 155 having rounded outer edges, and the inner ring preferably being rectangular in cross section. These rings are free to move in and out of the holder and to tip in all directions since the pistons on one side may if desired be pushed into the cylinders further than the remaining ones, and the rings are of soft rubber, but preferably two of the pins of the outer ring only, which lie on a horizontal center line when the device is in place on the machine, are limited in their movement by small collars as at 157 as I have found this arrangement to hold the fruit better against slipping. These collars 157 do not destroy the resiliency of the outer ring at these two points but modify it as it must be remembered that the arm itself is resiliently urged inward or toward the fruit when in clamping position.

During the inward movement of carriage 10 a tip cutting knife 44 pivotally mounted on the bloom end device 8 is actuated by an operative connection 45 of the knife striking a wedge or cam 46 fixed on the machine, and then through means of additional levers 36, 137 (see Fig. 8) actuated by a suitable cam on main cam shaft, device 8 is moved faster than device 9 (as per No. 7 of the schedule) and swung to the left out of the way. The latter movement is accomplished when device 8 arrives at the end of a stabilizing guide 47, and a stud 8' of the device enters slot 48 of a pivoted lever 49 engaged by an extending cam 50 on main carriage 51 to swing lever downward to the left against tension of a returning spring 235. Tip cutter knife is returned positively upon reverse of carriage 10 by suitable leverage indicated.

Main carriage 51 is a rigid U shaped casting with its legs extending toward the feeding end of the machine on opposite sides of plate 24 and rollably supported on eight grooved rollers 52 fitting on rigid tracks 53 made of square bars which engage above the top rollers and below the lower rollers. This carriage is moved back and forth at each revolution of the cam shaft by means of levers and rods 54—55—56 as best indicated in Fig. 11 and wherein rod 56 is connected to a crank disk 57 on the end of cam-shaft 6 by means of a slidable bearing block 58 provided with slack 59 in the head 60 of rod 56 so that the carriage will lag at each end of the stroke as the crank goes over center (Refer to Nos. 8 and 14 of the schedule).

The whole leverage described is repeated on the other side of the machine and the cam shaft provided with a crank disk at both ends so as to equalize the pull on carriage. (Note— parts generally duplicated on both sides of the machine are primed on the right-hand side of the machine.)

The object of the carriage 51 is to mount the peach clamping devices for forward and backward movement in clamping the peach and dragging it through the saw, and also to provide movable mountings for the clamping devices so that they may be raised and lowered for shifting the peach halves upon plate 24.

To effect these various motions of the clamping devices 150—150' the devices (refer to Figs. 11, 12, and 13) are each carried on a horizontally extending arm 61, 61' (one device and arm only being shown in these figures), the arm being vertically pivoted on a vertical shaft 62. This shaft 62 is carried on the carriage and supported for vertical sliding movement thereon, so that the arm while free to pivotally swing on the shaft may also be raised or lowered bodily therewith.

The clamping device 150 is moved in and out with respect to the pitting table or plate 24 by the action of a swinging rod 63 actuated from the main cam shaft 6 as hereinafter described, and is raised and lowered through motion of an extension arm 64 tight on the pivotal pin 65 of lever 54 and which extension arm is pivotally yoked at its outer end at 65' to a collar 66 slidable on a rod 67 pivoted to the lower end of shaft 62, slidable collar 66 bearing against a collar 68 secured to the rod at the proper place so that as lever 54 rocks to oscillate the carriage, extension 64 will raise the shaft 62 and thereby shift arm 61 and clamping device 150 on the main plate or pitting table 24. Upon return movement the arm will fall by gravity, tho should it fail to do so collar 66 will strike a spaced fixed collar 69 on rod 67 and force the shaft and its arm downward.

While left arm 61 carrying device 150 is rising, the right arm 61' and device 150' on the opposite or right side of the plate 24 is correspondingly falling and vice versa. To effect this I provide an intermediate lever indicated at 70 in Fig. 11A. This is not seen in the main drawings on account of interference of frame and other parts but its action will be easily understood by any mechanic as it is merely a rocker bar pivoted at an intermediate point to the carriage frame and with its outer ends respectively pivoted to its rod 67' and shaft 62' through the instrumentality of a link 71 pivotally connecting the rocker bar and an upper arm 72' pivotally mounted on one of the carriage roller pivots and engaging the vertical shaft 62' at its upper end in a slotted connection, all so as to reverse the motion for shaft 62' as described and thus produce a downward sliding of shaft 62' when its rod 67' is moved upwards, a spring 236' aiding return movement.

Arm 72' has its counterpart 72 on the left side of the machine with the same slotted connection to shaft 62 (but no link 71 or bar 70). One object of these arms is to act as a key for their respective shafts 62, 62' to prevent rotation of these shafts.

To effect the inward swinging of arms 61, 61' I provide two short horizontally disposed stub shafts 73, 73' on carriage 51 and rock same at the proper time at each forward movement of the carriage through means of a suitably shaped cam (80 in Fig. 11) on cam shaft 6 operatively connected to the shafts 73 through a suitable series of cranks, levers and rods, numbered from 74 to 79 (Fig. 11). Also mounted on the carriage are two short vertical shafts 81, 81' respectively at opposite sides of plate 24 geared at their lower ends to shafts 73, 73' by bevel gearing 82, 82', the arrangement being such that these two vertical shafts are simultaneously rocked in opposite directions by the rocking of shafts 73, 73'.

Standing out from shafts 81, 81' respectively and parallel therewith are rods 63, 63' carried on short arms 83 so as to form a swinging lever or cam on each shaft 62, 62' to force the rear ends of the arms 61, 61' in or out in the rocking of shafts 73, 73' Fig. 13 shows the action, and wherein the rod 63 lies between the rear extension 84 of clamping arm 61 and a pin 85 carried on a side projection 86 of extension 84 and which projection is spring tensioned at 87 to a side projection 88 from the hub of arm 61. Extension 84 is pivoted at 89 in a slot in the heel of 61 so that it can swing relative thereto but is normally pulled up tight against an adjustable stop 90 by springs 87.

In the position of parts of Fig. 13 rod 63 holds device 41 swung outward or away from the pitting table as to release the pitted fruit preparatory to advancing to clamp a fresh half. When shaft 81 rocks it carries rod 63 and extension 84 outward to dotted position in Fig. 13 thus through influence of springs 87 on projection 88 resiliently pulls arm 61 and device 150 inward to clamp the fruit.

To prevent device 150 swinging in too far and to always preserve clearance between it and the saw in case no fruit were in position a jaw 91 is formed on the lower end of the arm hub arranged to strike a similar jaw on a collar 92 fixed to shaft 62. This collar is shown in Fig. 12 as in contact with the upper end of lower shaft bearing 93 formed on or attached to carriage 51 as the arm 61 is here shown dropped to lowest position as for pitting this side of the peach and not yet risen to align with next peach to be received.

When stub shafts 73, 73' are rocked by the main cam shaft to clamp a peach, each is locked by a dog 94 rising over a spring actuated latch 95 pivoted to the carriage at 96 and provided with a laterally extending releasing arm 97 which, when the carriage 51 is at the end of its travel (to the left in Fig. 12) lies under a lever 98 mounted on a rock-shaft 99 supported on the frame of the machine and which shaft is rocked each time the foot treadle 13 of the machine is depressed so that lever 98 will trip latch arm 97 and the rock shafts 73 will be released and clamp devices fly outward to drop the pitted peach halves as per #1 of schedule.

Upon release of latch 95 crank 74 and rod 75 fall to reverse shaft 73 and their weight is assisted by springs if necessary, such for instance as a light tension spring 100 connected from carriage 51 to a leverage point on arm 83.

The operation of fruit clamp release latches 95, 95' by the rocking of shaft 99 is carried out by link and crank connections 101 to 104, the latter being pivoted to a lever 105 of a device or safety lock which prevents depression of the foot treadle (to start cycling of the machine by release of clutch trip 14) until the pitting blades have both swung through their respective halves of the fruit.

This locking arrangement comprises a bracket 106 secured to the base of the frame 1 and to which bracket the lever 105 is pivoted.

A cross bar 107 extending from and depressed by the foot pedal lies on top of lever 105 so as to force it down when the pedal is pushed downward, and ordinarily this would pull rod 104 to release latches 95, but lever 105 has a heel 108 locked under a small lever 109 also pivotally mounted on a bracket 106. The upper end of lever 109 extends above the bracket and lies adjacent a rod 110 which is slidably pinned at 111 to an upwardly extending arm of lever 105, and which rod 110 is provided with a lug 112 adapted to strike lever 109 at the end of each movement to the right of the rod to thereby release lever 105 so that it can fall under pressure of the foot pedal rod 107, and the lever 105 will be forcibly lifted at each end of the leftward movements of rod 110 when pin 111 reaches the end of slot 113, and locking lever 109 being spring actuated will fall into place to again firmly lock lever 105 against downward movement as before.

The back and forth movements of rod 110 are effected by direct pivotal connection of this rod at 114 with the leverage system which swings the blades (and also operates the slides 42, 43 in the pitting table).

This leverage or linkage which controls the blades will now be described so as to show its relation to cycle lock 105.

Each pitting blade it must be remembered is in the form of an arch which is kept vibrating irrespective of its bodily swinging thru the fruit, and the system now of interest is the linkage which controls bodily swinging of the blades. A detailed description of the blade carriages will follow.

With reference particularly to Figs. 4, 12, 18, 19 each blade carriage is rocked about a half circle by means of a gear segment 115 pivoted at 116 to the frame 1 of the machine oscillated by a pull and push of rod 117 pivoted at one end at 118 to an arm extending from the segment and at 119 to a lever 120 pivoted at 121 to the frame 1 and resiliently pulled by a spring 122 anchored to the machine at 123 so as to push rod 117 for working the gear segment 115 in a direction to swing the blade of its carriage through the fruit for cutting out its pit or core, and when lever 120 is moved in the reverse direction against the pull of spring 122 it pulls rod 117 to swing the blade in reverse direction or back to starting point for the next fruit.

It is understood that an independent set of the elements described is used for each blade.

In the operation of the machine a suitable cam on the cam shaft 6 moves lever 120 in direction against spring 122 to bring blade to starting point, and the falling away of the cam at the proper time permits lever 120 to return under action of spring 122 and through its force only carry the blade through the fruit.

To carry out the above a vertical shaft 124 is rotatably supported at the discharge end of the machine, and bevel gears 125 connect this shaft to a horizontal shaft 126. A crank arm 127 on shaft 126 is pivotally linked by a rod 128, crank 129, rod 130, crank 131, shaft 132, crank 133 (Fig. 1) arm 134, cam roller lever 135 for operation by a cam 136 on main cam shaft 6. The arrangement being such that the shaft 124 will be rocked one way by the cam shaft 6 and will return by action of a coiled spring 137 mounted on shaft 124.

Secured to shaft 124 adjacent each lever 120 is a disk cam 138 which upon rocking of shaft 124 by cam shaft 6 as explained bears against a roller 139 on lever 120 to force same away to thereby throw blade to starting position. This disk cam 138 is so shaped to permit return of lever 120 and blade to swing into the fruit at the proper moment upon reverse rocking movement of shaft 124, and since this shaft is directly connected through its leverage organization at point 114 with cycle lock tripping rod 110, (see Fig. 12) it is manifest that unless shaft 124 returns to its starting point lock trip 109 will not release the foot treadle bar 107 and the next cycle of the machine cannot take place.

Therefore, to prevent the full return movement of shaft 124 I provide a latch to hold it before completion of its return movement and trip this latch by lever 120 just as its blade has completed its work. Fig. 19 shows this arrangement, the latch taking the form of a lever 140 pivoted to the frame at 141 and provided with a pin 142 adapted to lie in a cut-away part 143 of the disk when the lever is in released position, or to bear against a projecting lug 144 of the disk when in latched position. A light spring, as at 233 normally urges this latch lever to dotted position with pin 142 in the way of lug 144 upon movement of the disk 138, and just upon full return of lever 120 (the blade operated by it having completed its cut) an adjustable trip or screw 145 mounted on lever 120 strikes latch lever 140 and removes pin 142 from lug 144 thus permitting full return of shaft 124 and consequent kick off of treadle lock 105.

Since there is an independent latch 140 on each disk 138 it is manifest that if either blade has not completed its cut, or is hung up on a pit for any reason at all, the machine is locked against a succeeding cycle of operations.

If one or both blades should be hung up in the fruit for any reason, they may be backed out and again led into the fruit by means of a manually operated lever 146 provided with a hand grip 146' positioned just to the left of the operative. This lever (see Fig. 12) is pivoted at 147 to the frame, linked at 234, so as to slottedly engage the blade operating crank lever 131 as indicated at 148 so that upon pulling the upper end of the hand lever it will operate the entire blade (and slide) hook up, independently of its main cam on cam shaft 6, but by reason of the slotted connection 148 the hand lever does not move in the regular operation of the machine.

Usually by thus manually letting the blades in and out any refractory portion of some unusual pit will be overriden by the blade or blades involved, but if not, the disk cam latch 140 may be moved away from engagement with lug 144 by manually operated means, so that the machine can drop the partially pitted fruit and begin a new cycle. This is accomplished (see Fig. 19) through means of a spring returned push rod 149 accessible to the operative at the feeding end of the machine at 149', and which rod is pivotally attached at its remote end to a lever 158 arranged to strike a continuation 140' of latch lever 140 for throwing it to released position. This lever 158 is secured to a revolvably mounted shaft 159 to the other end of which a similar lever is secured for releasing the latch of the other blade.

Shaft 124 is also used to actuate the slides in the pitting table so as to open them just as the blades swing through into the fruit and close them after the blades return to starting point so as to provide an imperforate plate or table for the next peach to be pitted. To so operate the slides crank arms 161 are provided on shaft 124 connected by curved links 162 to rods 163 connected to the backs of the slides so that as the shaft is rocked to swing the blades it also operates the slides, the proportions of the parts and their setting being such as to open the slides just as the blades begin to swing.

The mounting of the arched pitting blades on their carriages will now be described, with particular refernce to Figs. 4, 5, 14, 15 and 18.

In the present machine the pitting blades function substantially the same as in my former patent mentioned, but the construction is different in being especially devised to suit the present environment.

Figs. 14 and 15 show one of the blade carriages in elevation, and Figs. 4 and 18, the gear segments and lever hook-ups for swinging or rocking the blades the half circle or more which they make and return in cutting out the pit of each peach, it being understood that there are two blades, one each side of plate 24 to operate therethrough in reverse directions, each for one of the peach halves when the slides 42, 43 in the plate are drawn.

Each blade 168 is thin, slightly flexible, arched as indicated and secured at its ends to a rocker bar 169 pivoted at 170 to a block 171 slidably mounted on a carriage 172 so that as viewed in the drawings it can move bodily to the right or left a short distance.

The blade is sharpened on one edge, and at the apex for a short distance it is provided with a few teeth which undulate transversely to the plane of the blade as indicated at 168', a valuable feature in overcoming any tendency of the blade to catch on any irregularities of the pit.

The carriage is U shaped with the slidable block 171 on one end, and the other end is enlarged or secured to a gear housing 173 and pivoted on a vertical axis 174 passing through or adjacent the blade and around which axis the blade swings in cutting out a half pit from the half of a peach.

The housing 173 has a tubular hub 175 revolvably supported in a bearing or shell 176 carried by the frame 1 and hollowed out inside to receive a long spur pinion 177 splined at 178 to hub 175 so that the hub (together with the blade carriage 172) can freely rise or fall while resiliently supported for so doing on a flat spring 179 secured to and projecting horizontally from the frame 1 and on which spring the carriage is free to revolve.

The side of the bearing shell 176 is cut away at 180 to admit gear segment 115 which meshes with pinion 177 for swinging the blade carriage.

The vibration or arcuate oscillation of the blade is effected thru a very rapid operation of rocker bar 169 by means of a small crank arm 181 loosely slidable on an eccentric portion 183 of a small shaft 184 rotatably carried in the lower arm of blade carriage 172. This shaft 184 is connected by miter gears 185 to a vertical shaft 186 which extends freely through tubular hub 175 and is provided at its free end with a cross arm 187 engaged by two long pins 188 projecting from a small belt pulley 189 mounted to revolve freely on a bushing 190 secured to the end of bearing shell 176. This arrangement constitutes a pin drive for the blade vibrating shaft and permitting it to freely rise and fall within hub 175 while being driven at a very high speed by pulley 189.

In Fig. 14 the belt drive extending from this pulley to the jack shaft 3 is indicated diagrammatically to complete this organization. The jack shaft 3 it is understood runs continuously in driving the band saw, and continuous arcuate vibrating of the blades is carried out from the jack shaft by means of a pulley 191, through a crossed belt 192 to a pulley 193 secured to a vertical shaft 194 secured to which are two pulleys as at 195 belted respectively as at 196 to the blade vibrating pulley 189, of each blade, one only being shown in Fig. 14.

Returning to the blade carriage 172, small crank 181 is pivotally connected at 197 to a vertically slidable plunger 198 provided with yoke arms 199 engaging the rocker bar 169 so that as the plunger 198 is rapidly oscillated by the crank 181 the blade will be rocked or arcuately vibrated about pivot 170, the mounting described permitting the bodily movement of blade on slidable block 171 as well as bodily swinging rotation upon operation of the gear segment 115.

Springs 200 and 201 control the sliding of block 171 and consequent "rise and fall" of the arched blade over the curve of the pit so that it will substantially hug the pit and adapt itself to all sizes.

Spring 201 is secured at one end at 202 to a clip attached to plate 24 and at the other end to a small lever 203 pivoted to the carriage and normally urging block 171 outward to the limit of a stop 204 though permitting it to go further if required. This spring determines the entering position of the blade, but as soon as the blade begins to swing the tension of this spring slacks off due to its angular mounting, and spring 200 controls the inward pull of blade towards the pit.

A feature of the saw which should be described, is the provision (Fig. 16) of a piece of gasket rubber 226 through which the saw runs. This piece of rubber fits snugly against the sides of the saw and is supported by a small metal tray 227 into which water is allowed to drip from a tube 228, the device being fixed in position on the downwardly moving or cutting bight of the blade. Similar blocks of gasket rubber 229 are mounted on flat spring holders 230 and arranged to resiliently press against the rubber covered edge or faces of the band saw wheels. These provisions are found to prevent breakage of the band saws previously occasioned by the accumulation of pasty fruit saw dust and juice. In place of the above devices stiff brushes were tried but the result was not so good as the special rubber blocks.

The discharge chute of the machine is a feature of importance. This chute 231 is positioned to catch the pitted fruit and pits as they fall from the pitting blades, and the chute is provided with a false bottom composed of longitudinally extending bars 232 spaced for the pits to fall through while the fruit halves pass along the top of the bars hence emerge in a separate layer from the pits.

In addition to the construction described the actual machine is fitted with guards for the saw and other parts likely to injure the operative, also for guiding the fruit to the chute, and many adjustments are provided for the various parts, but as all such construction is well known most of it has been omitted from the drawings to promote clarity of the illustrations as well as the description.

Attention is also here called to the fact that although the drawings show the main carriage as moved back and forth by levers operated by crank disks at opposite ends of the cam shaft 6, it is evident that this may be accomplished by cams on this shaft as used to operate the other levers, the cams or cranks giving the throw required in an equivalent manner, in fact in experiments made cams gave a better control of speed at all points of the devices operated thereby as there is no limit to cam surface variation, and it was therefore possible to slow down the travel of the fruit through the saw and hasten it before and after sawing while simply sliding along the guiding plates.

Another detail of construction which should be described, tho it functions substantially as in my prior Patent #1,581,482 is the latch trip arrangement which controls the spring actuated sliding movement of the bloom end device 8 towards stem end device 9. This is best shown in Fig. 21 wherein the receiving carriage 10 carries guide bars 12 and 47 upon which the bloom end device 8 slides, and is normally pulled toward the stem end device 9 by means of springs 206 anchored at one end each to a downwardly extending arm 207 secured at its upper end to the carriage, and the springs are secured at their other ends to a lever 208 pivoted at its lower end to arm 207 and yoked at its upper end at 209 to the slidable base 210 of the bloom end device.

A latch bar 205 pivoted at 211 to the carriage has an end 212 extending through the yoke and an abutment at 213 stopping the yoke from being pulled back by springs 206 to thus position device 8 relative to device 9 for insertion of a peach by the operative.

Secured to and projecting below latch bar 205 is a flat spring 214 which, upon return of the receiving carriage 10 to fruit receiving position, is pushed upward by a lever 215 operated only when and if the machine has completed its cycle and the blades have both swung back clear of the fruit, by means of a wedge-like extension 216 (see Fig. 12) on the end of the lock releasing lever 110, and which wedge engages a pin 217 on a lever 218 pivoted at 219 to the frame and linked at 220 to a bell crank arm 221 of which lever 215 is a part.

Thus when lock releasing lever 110 has fully returned upon completion of swinging operation of the blades, latch 205 will be resiliently urged upward by lifting of lever 215. This upward pressure on spring 214 is not sufficient to release latch from engagement with yoke at point 213 on account of the shape of the engaged portions tending to resist, but upon the operative inserting the bloom end of a peach in device 8 and pushing the peach to move device 8 slightly away from device 9, the latch 205 will fly upward and then upon the operative relaxing his pressure against the peach, device 8 will follow the peach and force it toward device 9 until centered between the devices, and after which the operative presses the treadle to start the machine on its next cycle, but if he maintains his foot upon the starting treadle there will still be a sufficient time interval at the end of each cycle to permit the insertion of a peach between the devices 8 and 9 as described.

A detail of construction aiding the insertion of the fruit between devices 8 and 9 with suture of the fruit directly vertical or in the plane of guide plates 21, is a small gage blade 222 adjustably pivoted at 223 to the upper guide plate in a position to extend above the peach being inserted by the operative, and which gage is so close to the peach as to enable the operative looking down from above it, to readily align the suture line of the peach therewith.

In reviewing my invention as above set forth it will be seen that one of the important features is the vertical guide plate and extensions thereof aligned with the saw and over which the fruit is slid for sawing and pitting.

Such a guide plate in fruit operating machines is not broadly new as evidenced perhaps first in the art by Stripling 820,150 who shows in Figs. 1 and 7 two forms of such plates aligned with a saw to which the fruit is fed, but insofar as is known no one has shown how to mechanically align a peach from its bloom and stem ends in relation to such a guide plate, nor any means of clamping a peach from opposite sides against the plate and dragging it along past the saw, nor to controlling the speed of travel of the peach in any way while traveling past the saw on such a plate, nor any means of maintaining the sawed halves of the fruit at all times with fixed pit relation to subsequent operations to be performed after sawing and while still against such a plate, nor to shifting of the sawed fruit halves on such a plate for pitting without separating the halves, nor the use of a band saw (or jig saw, or its equivalent for this purpose) in connection with such a plate whereby it becomes possible to extend the guide plate both front and back of the blade without loss of the guide support at any time, nor the sliding of a fruit impaled between two spaced plates of this kind without auxiliary supporting surface, nor to pitting instrumentalities arranged on opposite sides of such a plate, nor to doors or slides in such a plate, nor any and all of the combinations and sub-combinations with such a plate as claimed hereunder.

In the appended claims my use of the word "saw" is intended to cover the use of band, jig, or circular saw or disk cutter, as it is manifest that some of the subcombinations would not depend for their entire value on a specific type of cutter.

I claim:

1. In a machine for operating on fruit, devices for holding a fruit from diametrically opposite points, means for advancing the fruit thus held in relation to an operating instrumentality, and means for moving one of said devices outwardly from the fruit and then sidewise out of the path of the fruit.

2. In a machine for operating on fruit, a guide plate, devices for holding a fruit from diametrically opposite points, in the plane of said plate at the bloom and stem ends of the fruit, and means for forcing the thus held fruit into impaled engagement with said guide plate.

3. In a machine for operating on fruit, a pair of edgewise spaced guide plates, devices for holding a fruit from diametrically opposite points, in the plane of said guide plates at the bloom and stem ends of the fruit, and means for forcing the thus held fruit into impaled engagement with said guide plates.

4. In a machine for operating on fruit, devices for holding a fruit from diametrically opposite points, a pair of spaced guide plates aligned with said devices, and means for forcing the thus held fruit into impaled engagement with said guide plates, one of said devices extending laterally into the space between said guide plates.

5. In a machine for operating on fruit, a saw, a guide plate in the plane of the saw extending therefrom adapted for the impalement of a fruit for guiding to the saw, and means arranged and adapted to clamp the fruit from opposite sides against said guide plate and slide the fruit along the guide and past the saw.

6. In a machine for operating on fruit. a saw, a guide plate in the plane of the saw extending therefrom adapted for the impalement of a fruit for guiding to the saw, and means arranged and adapted to clamp the fruit from opposite sides against said guide plate and slide the fruit along the guide and past the saw, and a continuation of said plate beyond the saw on which the sawed fruit is received.

7. In a machine for operating on fruit, a flat guide plate arranged and adapted for edgewise impalement of a fruit thereon and for sliding therealong, a saw extending in the plane of the guide plate at the end thereof, and a continuation of said guide plate in the plane of and following the saw adapted to receive the sawed halves of said fruit and being of an area greater than the fruit halves so that the latter find a complete surface support thereon.

8. In a machine for operating on fruit, a saw, means for moving a fruit through the saw for bisecting the fruit, and a flat guide plate extending in the plane of the saw on which the sawed fruit is adapted to be slid, said plate extending over the area of the fruit halves, and provided with an area of reduced thickness under the area of a sawed pit in said fruit.

9. In a machine for operating on fruit, a saw, means for moving a fruit through the saw for bisecting the fruit, and a flat guide plate extending in the plane of the saw on which the sawed fruit is adapted to be slid, said plate extending over the area of the fruit halves, and provided with a relieved area under the area of a sawed pit in said fruit.

10. In a machine for operating on fruit, a saw, means for moving a fruit through the saw for bisecting the fruit, and a flat guide plate extending in the plane of the saw on which the sawed fruit is adapted to be slid, said plate extending over the area of the fruit halves, and a door in said plate adapted to be opened under said fruit.

11. In a machine for operating on fruit, a saw means for moving a fruit through the saw for bisecting the fruit, and a flat guide plate extending in the plane of the saw on which the sawed fruit is adapted to be slid, said plate extending over the area of the fruit halves, and a slidable door in said plate adapted to be opened under said fruit.

12. In a machine for operating on fruit, a saw, means for moving a fruit through the saw for bisecting the fruit, and a flat guide plate extending in the plane of the saw on which the sawed fruit is slid by further movement of said means, said plate extending over the area of the fruit halves, and a pair of spaced slides in said plate adapted for sliding movement to form openings in said plate to permit operating therethrough on said fruit after sawing in half.

13. In a machine for operating on fruit, a saw, means for moving a fruit through the saw for bisecting the fruit, and a flat guide plate extending in the plane of the saw on which the sawed fruit is slid by further movement of said means, said plate extending over the area of the fruit halves, and a pair of spaced slides in said plate adapted for sliding movement to form openings on said plate to permit operating therethrough on said fruit after sawing in half, and means for shifting the sawed halves on said plate to position over said slides.

14. In a machine for operating on fruit, a saw, means for moving a fruit through the saw for bisecting the fruit, and a flat guide plate extending in the plane of the saw on which the sawed fruit is slid by further movement of said means, said plate extending over the area of the fruit halves, and a pair of spaced slides in said plate adapted for sliding movement to form openings in said plate to permit operating therethrough on said fruit after sawing in half, and means for shifting the sawed halves on said plate to position over said slides, and means for operating the slides after shifting the sawed halves thereover.

15. In a machine for operating on fruit, a plate upon which opposite fruit halves are supported for pitting, and a pair of pitting blades positioned at opposite sides of said plate arranged and adapted to operate respectively on said opposite halves.

16. In a machine for operating on fruit, a flat plate upon which opposite fruit halves are supported for pitting, and a pair of pitting blades positioned at opposite sides of said plate arranged and adapted to operate respectively on said opposite halves.

17. In a machine for operating on fruit, a plate upon which opposite fruit halves are supported for pitting, and a pair of pitting blades positioned at opposite sides of said plate arranged and adapted to operate respectively on said opposite halves, and a pair of doors in said plate under each fruit half arranged and adapted for opening for the blades to operate therethrough.

18. In a machine for operating on fruit, a plate upon which a fruit half is adapted to be supported for pitting, and a door in said plate adapted for opening to provide an aperture for pitting the fruit therethrough.

19. In a machine for operating on fruit, a plate upon which a fruit half is adapted to be supported for pitting, and a sliding door in said plate flush on one side with the first mentioned plate adapted for opening to provide an aperture for pitting the fruit therethrough.

20. In a machine for operating on fruit, a plate upon which opposite fruit halves are supported for pitting, and a pair of pitting blades positioned at opposite sides of said plate arranged and adapted to operate respectively on said opposite halves, and a pair of slides in said plate positioned over said blades arranged for opening to operatively pass said blades.

21. In a machine for operating on fruit, a plate adapted to slidably support the two halves of a bisected drupe, means for sliding and also shifting the drupe halves relatively on said plate, and means for operating on the half pits of the shifted drupe halves.

22. In a machine for operating on fruit, a plate adapted to slidably support the two halves of a bisected drupe on opposite sides of the plate, means for sliding and also shifting the drupe halves relatively on the opposite sides of said plate, and means for operating on the half pits of the shifted drupe halves.

23. In a machine for operating on fruit, a fruit clamping device arranged and adapted to resiliently clamp against the curved outer side of a fruit and comprising a ring of soft rubber, a holder for said ring, and means resiliently supporting said ring from one side on said holder.

24. In a machine for operating on fruit, a fruit clamping device arranged and adapted to resiliently clamp against the curved outer side of a fruit and comprising a ring of soft rubber, a holder for said ring, and means resiliently supporting said ring from one side on said holder, and a second ring of soft rubber spaced within the first mentioned ring.

25. In a machine for operating on fruit, a fruit clamping device arranged and adapted to resiliently clamp against the curved outer side of a fruit and comprising a plurality of concentric rings of soft material, a holder for said rings, and means resiliently supporting said rings from one side of said holder.

26. In a machine for operating on fruit, a fruit clamping device arranged and adapted to resiliently clamp against the curved outer side of a fruit and comprising a ring of soft rubber, a holder for said ring, and means resiliently supporting said ring from one side on said holder, said ring being non-resiliently supported at one or more points in its diameter.

27. In a machine for operating on fruit, a fruit clamping device arranged and adapted to resiliently clamp against the curved outer side of a fruit and comprising a holder, a ring of resilient material of a size to fit against the outside of a fruit, means supporting and guiding said ring for movement in and out with respect to said holder.

28. In a machine for operating on fruit, a fruit clamping device arranged and adapted to resiliently clamp against the curved outer side of a fruit and comprising a holder, a ring of resilient material of a size to fit against the outside of a fruit, means supporting and guiding said ring for movement in and out with respect to said holder and resilient means urging said ring outward.

29. In a machine for operating on fruit, a fruit clamping device arranged and adapted to resiliently clamp against the curved outer side of a fruit and comprising a holder, a plurality of pins slidably arranged on said holder over the area of a fruit to be held, and resilient means at the outer ends of the pins adapted to engage the fruit.

30. In a machine for operating on fruit, a fruit clamping device arranged and adapted to resiliently clamp against the curved outer side of a fruit and comprising a holder, a plurality of pins slidably arranged on said holder over the area of a fruit to be held, resilient means at the outer ends of the pins adapted to engage the fruit, and means resiliently urging said pins outward.

31. In a machine for operating on fruit, a band saw, means for operating the saw, a plate extending forwardly of the saw positioned in the plane thereof adapted for engaging upon its edge a fruit body for sliding the fruit therealong to the saw, and a plate at the rear of the saw extending in the plane thereof adapted to receive the fruit halves after passing the band saw.

32. In a machine for operating on fruit, a band saw, means for operating the saw, a plate extending forwardly of the saw positioned in the plane thereof adapted for engaging upon its edge a fruit body for sliding the fruit therealong to the saw, and a plate at the rear of the saw extending in the plane thereof adapted to receive the fruit halves after passing the band saw, said saw being of a width and the plates positioned so close thereto as to afford sliding support for the fruit both front and back of the saw while passing the saw.

33. In a machine for operating on fruit, a normally imperforate plane plate, a curved pitting knife mounted on one side of the plate, means for positioning a fruit half on the other side of said plate, and a slide in said plate between said knife and fruit arranged and adapted for opening after the fruit is positioned thereover for said knife to operate through, and means for opening said slide and operating said knife.

34. In a machine for operating on fruit, an arched blade adapted for cutting out the pits of the fruit, said blade provided on its cutting edge adjacent the crown of the arch with relatively small flutes or lateral undulations.

35. In a machine for operating on fruit, a saw, a fruit guide leading to said saw, devices for centralizing a fruit between its bloom and stem ends with center of pit in line with saw, and means for reciprocating said centralizing devices and delivering such centralized fruit to said guide upon one way motion of said devices.

36. In a machine for operating on fruit, a pair of pitting blades, means for presenting a half peach to each blade for pitting, means for independently swinging the blades for cutting out the pits, and dual locking means on said machine locking the machine against further moving the fruit, and means whereby said locking means is released completely only upon completion of the cutting operation of both blades.

37. In a machine for operating on fruit, an arched pitting blade, a carriage upon which said blade is pivotally mounted to swing through a fruit body for cutting out the pit thereof and movably mounted to conform to said pit, means for so swinging the blade, means for causing the blade to resiliently hug the pit, and a spring connected to the blade mechanism arranged and adapted to pull the blade outward for relatively greater throw in entering the fruit and to slack off during the cutting operation whereby the blade will fall back to a smaller arc on the flat side of the pit.

38. In a machine for operating on fruit, an arched pitting blade, a carriage upon which said blade is pivotally mounted to swing through a fruit body for cutting out the pit thereof and movably mounted to conform to said pit, means for so swinging the blade, and a plurality of opposed differential springs so arranged on the carriage as to vary the pull of said blade against the pit as it is swung therearound.

39. In a machine for operating on fruit, a frame, a vertically disposed plate forming a support for pitting fruit and formed at one end for impalement of an unpitted fruit, a reciprocably mounted carriage extending along both sides of said plates, means on said carriage arranged to clamp the fruit impaled on the plate at each side thereof, and means for reciprocating said carriage to move fruit along said plate to pitting position.

40. In a machine for operating on fruit, devices for holding a fruit from the bloom and stem ends, and a gage plate extending adjacent the fruit when in said devices arranged for optically aligning the fruit with respect thereto.

41. In a machine for operating on fruit, a pair of edgwise spaced flat guide plates arranged and adapted to edgewise impale a drupe thereon and permit sliding of the fruit therealong, and means movable relative to said plates arranged and adapted to engage and force said drupe along said guide plates, a saw at the rear ends of said guide plates positioned in the plane thereof for bisecting the fruit and its pit as the fruit is slid along, and a flat guide plate in back of the saw in the plane thereof forming with said saw substantially a continuation of the spaced guide plates at the other edge of the saw.

JOSEPH P. BEM.